United States Patent
Bignolles et al.

(10) Patent No.: US 6,642,980 B1
(45) Date of Patent: Nov. 4, 2003

(54) METHOD AND APPARATUS FOR IMPROVING THE VIEWING ANGLE OF AN LCD SCREEN BY TWISTING THE POLARIZERS AND COMPENSATING STRUCTURES

(75) Inventors: Laurent Bignolles, Bordeaux (FR); Frédéric de Lauzun, St Medard en Jalles (FR); Laurent Georges, Bordeaux (FR); Jean-Jacques Laborie, St Jean d'Illac (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/647,919

(22) PCT Filed: Apr. 13, 1999

(86) PCT No.: PCT/FR99/00863
§ 371 (c)(1),
(2), (4) Date: Oct. 13, 2000

(87) PCT Pub. No.: WO99/53367
PCT Pub. Date: Oct. 21, 1999

(30) Foreign Application Priority Data

Apr. 14, 1998 (FR) .......................................... 98 04628

(51) Int. Cl.⁷ ............................................. G02F 1/1335
(52) U.S. Cl. ...................................... 349/117; 349/179
(58) Field of Search ................................. 349/120, 118, 349/121, 119, 117, 179

(56) References Cited

U.S. PATENT DOCUMENTS

| | | |
|---|---|---|
| 5,467,480 A | 11/1995 | Baudou et al. |
| 5,479,294 A | 12/1995 | Darrieux et al. |
| 5,517,337 A | 5/1996 | Dupin et al. |
| 5,581,806 A | 12/1996 | Capdepuy et al. |
| 5,623,730 A | 4/1997 | Baudou et al. |
| 5,742,937 A | 4/1998 | Baudou et al. |
| 5,777,709 A * | 7/1998 | Xu .............................. 349/120 |
| 5,812,225 A | 9/1998 | De Lauzun et al. |
| 5,990,997 A * | 11/1999 | Jones et al. ................. 349/118 |
| 6,014,769 A | 1/2000 | Baudou et al. |
| 6,078,428 A | 6/2000 | Rambert et al. |
| 6,144,431 A * | 11/2000 | Yamahara et al. .......... 349/117 |
| 6,342,872 B1 | 1/2002 | Potin et al. |

OTHER PUBLICATIONS

U.S. patent application Ser. No. 09/647,919, filed Oct. 13, 2000, pending.
U.S. patent application Ser. No. 10/019,077, filed Dec. 26, 2001, pending.
U.S. patent application Ser. No. 10/088,905, filed Mar. 25, 2002, pending.
U.S. patent application Ser. No. 10/168,386, filed Jun. 21, 2002, pending.
U.S. patent application Ser. No. 09/647,919, Oct. 13, 2000, pending.
U.S. patent application Ser. No. 09/856,171, Jun. 4, 2001, pending.
U.S. patent application Ser. No. 10/148,872, Jun. 11, 2002, pending.
U.S. patent application Ser. No. 10/168,536, filed Jul. 1, 2002, pending.

* cited by examiner

*Primary Examiner*—Robert H. Kim
*Assistant Examiner*—P. R. Akkapeddi
(74) *Attorney, Agent, or Firm*—Oblon, Spivak, McClelland, Maier & Neustadt, P.C.

(57) ABSTRACT

A display device with a liquid crystal cell including a layer of twisted nematic liquid crystal placed between two polarizers and including, between the liquid crystal layer and each of the polarizers, a structure for compensating for cell contrast variations according to the observation angle which has an orientation in the plane of the cell. The pass directions of the polarizers are separated by an angle of 90+A degrees, in which A is not zero, and the orientations of the two compensation structures are separated by an angle of 90+B degrees, in which B is not zero. Such a structure may find particular application to a liquid crystal screen, especially for avionics.

17 Claims, 4 Drawing Sheets

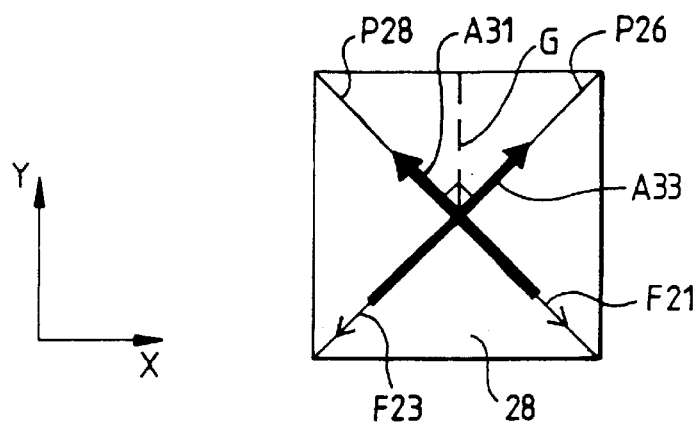
PRIOR ART FIG.4
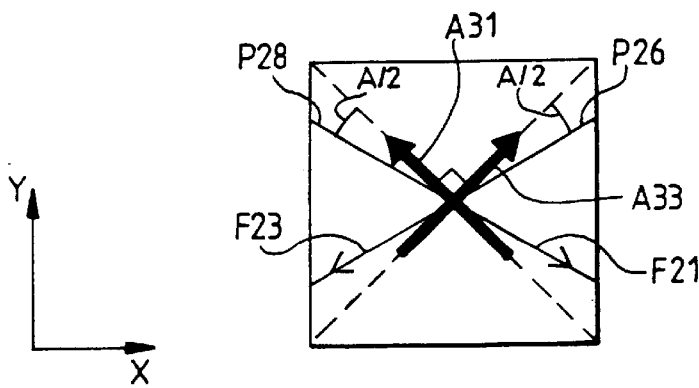
FIG.5
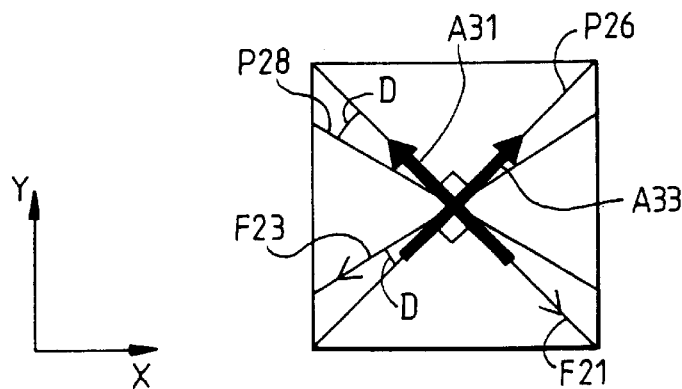
FIG.6

METHOD AND APPARATUS FOR IMPROVING THE VIEWING ANGLE OF AN LCD SCREEN BY TWISTING THE POLARIZERS AND COMPENSATING STRUCTURES

BACKGROUND OF THE INVENTION

1. Field of the Invention

The present invention relates to electrooptical display devices modulating the light passing through them and more specifically to liquid crystal panels.

2. Discussion of the Background

These panels exhibit promising characteristics for making display screens in avionics, in that they are less bulky than the conventional cathode tube screens and they use less power.

On a liquid crystal panel, an image is displayed using juxtaposed colored, or black, elementary dots. An elementary dot corresponds to the light transmitted to its front face by a liquid crystal cell illuminated on its rear face. From the rear to the front, a liquid crystal cell generally comprises a stack of a polarizer, a first transparent substrate, a thin layer of liquid crystal, a second transparent substrate and an analyser.

These transparent substrates comprise electrodes which are also transparent, to which the application of voltage makes it possible to subject the liquid crystal molecules to an electric field perpendicular to the plane of the cell.

A liquid crystal molecule also exhibits two remarkable characteristics; on one hand, it is capable of modifying the polarization of light passing through it, depending on said molecule's spatial orientation and, on the other hand, an electric field is capable of changing its orientation.

Thus, the rest state (zero voltage) of and the application of voltage to the liquid crystal layer lead to two different arrangements of the liquid crystal molecules in the layer, defining two states (activated state and unactivated state) of the cell such that, for example, in one state the cell allows light to pass and in the other the cell absorbs it. Depending on its state, the cell makes it possible to display a white dot or a black dot. Gray dots can be produced with intermediate voltages which impose other orientations on the liquid crystal molecules. In addition, the insertion of a color filter into the cell stack makes it possible to present a colored dot. This technology makes it possible to display images in black and white or in color.

However, with a liquid crystal panel, the image perceived depends on the viewing angle at which the panel is observed. A high-quality image perceived by the observer when he is looking along the direction normal to the plane of the panel is distorted when he is looking in a direction inclined with respect to this normal direction. It is this which generally limits the use of a liquid crystal panel to observation directions which depart little from the normal to the panel, i.e. the panel has a restricted viewing angle.

For a display screen which must be legible to an observer whose position is not fixed and/or to several observers placed around the screen, such as, for example, a screen in an airplane pilot's cabin, the restriction in the viewing angle of the liquid crystal panel is a serious drawback.

For the screen user, the liquid crystal layer exhibits defects in optical behaviour. The defects are especially due to the light contrast between the states of a cell, which contrast causes the particular problem of changing with the observation angle and therefore of disturbing the observation of a panel.

This effect is explained by the natural birefringence of a liquid crystal molecule in which the modification by the molecule of the polarization of the light passing through it depends on the relative orientation between this light and the molecule, the change of observation angle leads to a modification of the polarization of the light received by the analyser and therefore to a modification of the transmission of the cell.

The prior art provides partial corrections of this birefringence in certain situations where it is a problem for various types of liquid crystal cells.

We are more particularly interested in cells comprising a twisted nematic liquid crystal and crossed polarizers (one polarizer, one analyser), located on either side of the liquid crystal layer. The helix rotates the polarized light by about 90 degrees. In their unactivated state, the cells strongly transmit the light received. Their activated state corresponds to considerable absorption of the light; an activated cell observed along its normal has a very low light transmission. The main defect of these cells is, in the activated state, a marked increase in the light transmission for observation inclined with respect to the normal to the cell. A black dot observed perpendicularly to the cell becomes clearer when the observer moves away from the normal to the cell, the contrast between white and black decreases with this movement with respect to the normal. The contrast is the ratio of the transmissions of each state that is the ratio of the cell transmission in the activated state to the cell transmission in the unactivated state.

In the activated state, the birefringence of the liquid crystal molecules is undesirable.

The prior art proposes to correct, however incompletely, this birefringence by the addition of a birefringent compensation film into the cell stack.

A first known correction consists in using a uniaxial birefringent film exhibiting a negative anisotropy of refractive index in the direction perpendicular to the plane of the cell. The film is negative uniaxial with an extraordinary optical axis normal to the cell.

Corrections giving increased satisfaction were then developed. Thus, Patent EP 0,646,829 proposes a birefringent film comprising a support exhibiting the characteristics of the first known correction on which a discotic liquid crystal oriented by rubbing is polymerized. It describes a type of birefringent film comprising two negative uniaxial media, each exhibiting an extraordinary optical axis, one medium being parallel to the normal to the cell, the other medium being inclined with respect to this normal on one hand and with respect to the plane of the cell on the other.

With compensation films, the problem consists in further widening the field of observation of a liquid crystal panel in a plane perpendicular to the panel. In particular, for a panel placed vertically, it is endeavored to improve the horizontal viewing angle ensuring good legibility of the panel for an observer moving horizontally to the right or to the left of the panel.

SUMMARY OF THE INVENTION

The invention provides a novel solution which consists in uncrossing the polarizers and the compensation films in order to widen the observation angle.

More specifically, the invention provides a display device with a liquid crystal cell comprising a layer of twisted nematic liquid crystal placed between two polarizers and comprising, between the layer of liquid crystal and each of the polarizers, a structure for compensating for the cell contrast variations according to the observation angle, which structure comprises a layer of a negative uniaxial birefringent material with an extraordinary axis perpendicular to the plane of the cell on which a layer of a negative uniaxial birefringent material with an extraordinary axis inclined with respect to the normal to the plane of the cell is superimposed, the orientation of the compensation structure being parallel and in the opposite direction to the projection of the extraordinary axis inclined to the normal to the plane of the cell, characterized in that the pass directions of the polarizers are separated by an angle of 90+A degrees where A is not zero and the orientations of the two compensation structures are separated by an angle of 90+B degrees where B is not zero.

Compensation of the cell contrast variations according to the observation angle corrects the irksome effects of transmission variations of the birefringent cell according to the observation angle. The compensation corrects the cell birefringence.

The novel solution of the invention consists in arranging the polarizers in a particular relative position which is different to that of the prior art in which the polarizers are crossed perpendicularly in such a way that one polarizer can block the light polarized by the other. The particular position may for example be obtained by uncrossing one pair of polarizers of the prior art. The uncrossing corresponds to a rotation about the normal to the cell of one of the polarizers and to a rotation about the same axis, but in the opposite direction, of the other polarizer. The absolute values of the angles of each of the uncrossing rotations are equal or different.

The uncrossing is done in the direction where the increase in the range of viewing angles is the most favorable. The uncrossing will take place in one direction or in another depending on whether the nematic crystal helix generated by the alignment directions of the molecules on the faces of the liquid crystal layer, are a helix in the anticlockwise or clockwise direction.

The uncrossing is described in order to facilitate understanding of the relative positions in the invention, but the relative arrangement of the elements of the cell may, of course, be obtained directly without physically carrying out rotation operations.

The structure for compensating for the cell contrast variations is preferably in the form of a plane film parallel to the plane of the cell and characterized by an orientation direction in this plane. In the invention, the orientation directions of each of the compensation structures, one on each side of the liquid crystal layer, are no longer perpendicular, they are also uncrossed.

In a preferred embodiment of the invention, the absolute values of the angles of each of the uncrossing rotations are different, one preferably being zero.

The alignment directions of the molecules on the faces of the liquid crystal layer are preferably perpendicular.

The uncrossing of the polarizers, as is described in order to facilitate understanding, is preferably done using polarizers which are crossed with each other and are such that each polarizer is crossed with the alignment direction of the face closest to the liquid crystal layer. These relative orientations between a polarizer and the alignment direction of the closest liquid crystal molecules have the advantage of limiting the contrast inversions.

The invention makes it possible to widen the observation field of a liquid crystal panel. In particular, for a vertical panel, the horizontal viewing angle is widened.

Other characteristics and advantages of the invention will appear on reading the description which follows and which is made with reference to the appended drawings in which:

BRIEF DESCRIPTION OF THE DRAWINGS

FIG. 4 shows an end-on view of the orientations according to the prior art of the cell elements;

FIG. 5 shows an embodiment of the invention;

FIG. 6 shows another embodiment of the invention.

DESCRIPTION OF THE PREFERRED EMBODIMENTS

Figure 1:
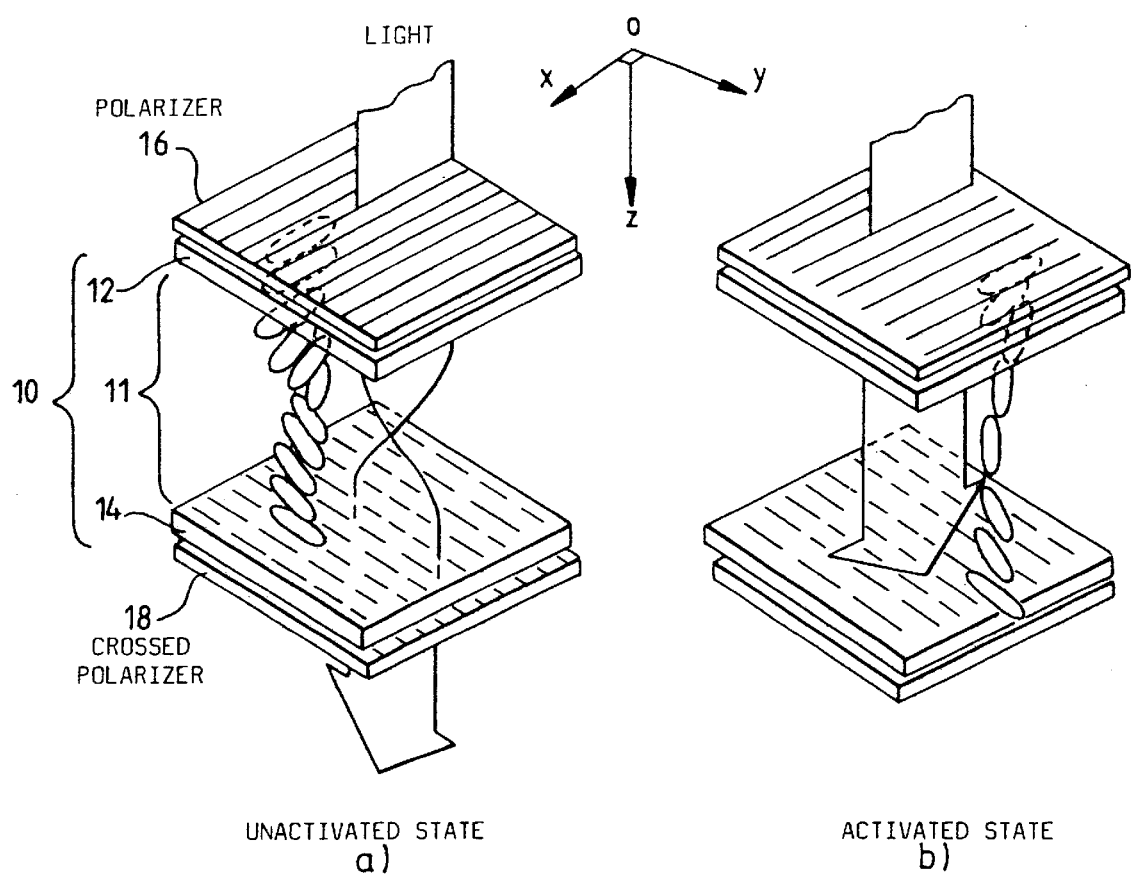
FIG. 1 shows schematically a liquid crystal cell in a known configuration with crossed polarizers, with FIG. 1a illustrating the unactivated state of the cell and FIG. 1b illustrating the activated state of the same cell.

A liquid crystal cell is shown schematicaly in FIG. 1; it comprises, in a known way in the stack along the Oz axis, a polarizer 16, a first transparent substrate 12, liquid crystal molecules 11, a second transparent substrate 14 and an analyser which is a polarizer 18 crossed with the first polarizer 16. The first 12 and second 14 substrates and the molecules 11 together forms a liquid crystal layer 10 which is plane and parallel to the Oxy plane.

In the case of a twisted nematic liquid crystal, the liquid crystal molecules close to one of the two transparent substrates, 12, are oriented in a first alignment direction, for example parallel to the Ox axis, and the molecules close to the other substrate, 14, are oriented along a second alignment direction, for example parallel to the Oy axis. The first and second alignment directions are preferably perpendicular to each other.

The alignment can be obtained by treating those faces of the substrates 12 and 14 which are in contact with the liquid crystal, for example by rubbing the surface in the alignment direction.

When the cell is in the rest state, it is in the unactivated state illustrated by FIG. 1a in which the molecules 11 of the crystal layer are parallel to the Oxy plane of the cell and form, using the perpendicular alignment directions of the substrates, a helix within the thickness of the layer 10. Light received on the rear face of the unactivated cell is linearly polarized by the polarizer 16, then, on passing through the thickness of the twisted liquid crystal layer 10, this linear polarization is modified by the birefringence of the molecules 11 that it passes through and undergoes a rotation of 90 degrees due to the helix. On exiting from the layer 10, the light is polarized perpendicular to the first polarizer 16 and it can therefore pass freely through the second crossed polarizer 18, the pass direction of which is perpendicular to that of the first polarizer 16. The cell in the unactivated state strongly transmits light.

When a voltage is applied to the cell, it is in the activated state illustrated by FIG. 1b in which an electric field perpendicular to the thin layer 11 is applied between the energized transparent electrodes borne by the substrates 12 and 14. As the molecules 11 of the layer 10 tend to align with the electric field, they stand up in relation to the plane of the cell and the previously observed helix is destroyed within the thickness of the layer 10. In the activated state, the light also passes through the layer 11 but the arrangement of molecules that it encounters means that it tends to maintain a plane polarization in the direction imposed by the polarizer 16. The light at the exit of the layer 10 is absorbed by the second polarizer 18 crossed with the first polarizer.

In the activated state, the cell observed along the direction perpendicular to its plane transmits virtually no light. However, when the observation direction is inclined with respect to the normal to the cell, the inclined light is affected by the birefringence of the molecules which modifies its polarization and some of this light then passes through the second polarizer.

The arrangement of the molecules in the energized liquid crystal layer is quite complex, since the observed destruction of the helix in the rest state is only partial.

When a liquid crystal molecule is stretched, to a first approximation, it behaves optically as a positive uniaxial birefringent medium whose extraordinary axis is oriented along the length of the molecule. The energized layer of liquid crystal may be represented in a highly simplified manner by a stack of sublayers in which the birefringence is homogeneous and the molecules have the same orientation. In this representative model, each sublayer is a positive uniaxial birefringent medium, the direction of the extraordinary axis of which characterizes the sublayer.

Figure 2:
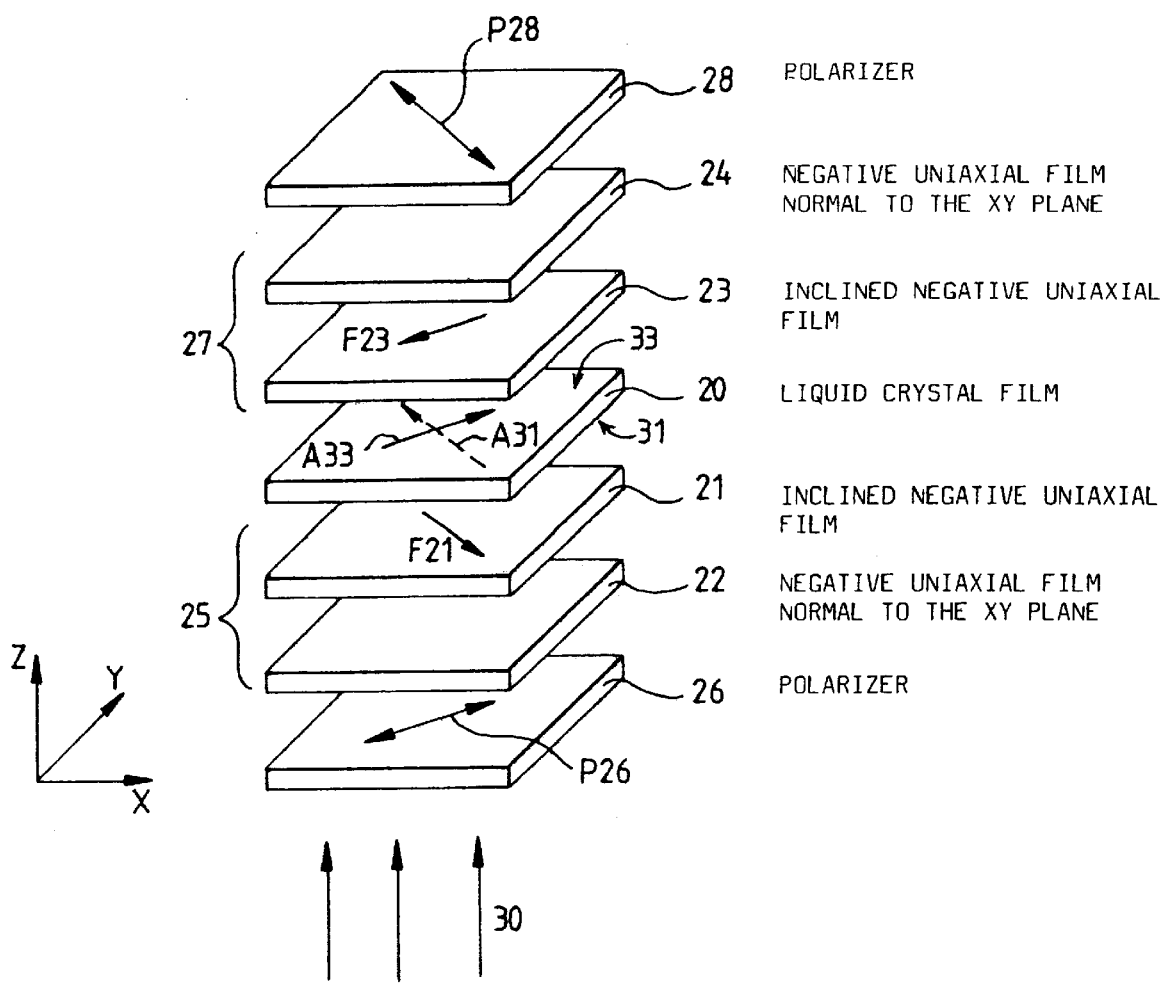
FIG. 2 shows a cell of the prior art with two optical compensation structures.

FIG. 2 shows, along the Z axis, the known stack of a liquid crystal cell backlit by the light rays 30 and comprising two optical compensation films 25, 27, one on each side of the plane liquid crystal layer 20, said films being situated between the two polarizers 26 and 28. The plane of the cell is the XY plane. The rear 25 and front 27 films are, for example, of the type of those described in Patent EP 0,646, 829. Each film 25, 27 comprises within its thickness a negative uniaxial medium 22, 24 with extraordinary axis Z perpendicular to the XY plane of the cell and a negative uniaxial medium 21, 23 with extraordinary axis inclined with respect to the normal Z to the cell and with respect to the XY plane of the cell. The inclined uniaxial medium 21, 23 being the closest to the liquid crystal layer 20.

The polarizers 26, 28 of this cell are crossed-their pass directions, respectively P26 and P28, are perpendicular to each other. The crystal layer 20 has an alignment direction A31 of the molecules on its rear face 31 in the XY plane which is perpendicular to that A33 of the front face 33, which is also in the XY plane. In the rest state, the crystal layer has a helix whose twist is, for example, 90 degrees within its thickness. The pass direction P26, P28 of each polarizer is preferably crossed with the alignment direction A31, A33 of the face closest to the liquid crystal layer.

The orientation of the uniaxial medium 21 adjacent to the rear face 31 of the layer 20 is marked in the XY plane by the direction F21 of rubbing carried out when preparing the film 25 according to the patent cited. The direction F21 is parallel to the alignment direction A31 of the molecules on the rear face 31 but in the opposite direction. Similarly, the orientation of the uniaxial medium 23 adjacent to the front face 33 of the layer 20 is marked by the direction F23 parallel and in the opposite direction to the alignment A33 of the molecules of the front face 33, the direction F23 corresponding to the rubbing for preparing the film 27. The directions F21 and F23 are perpendicular to each other.

Figure 3:
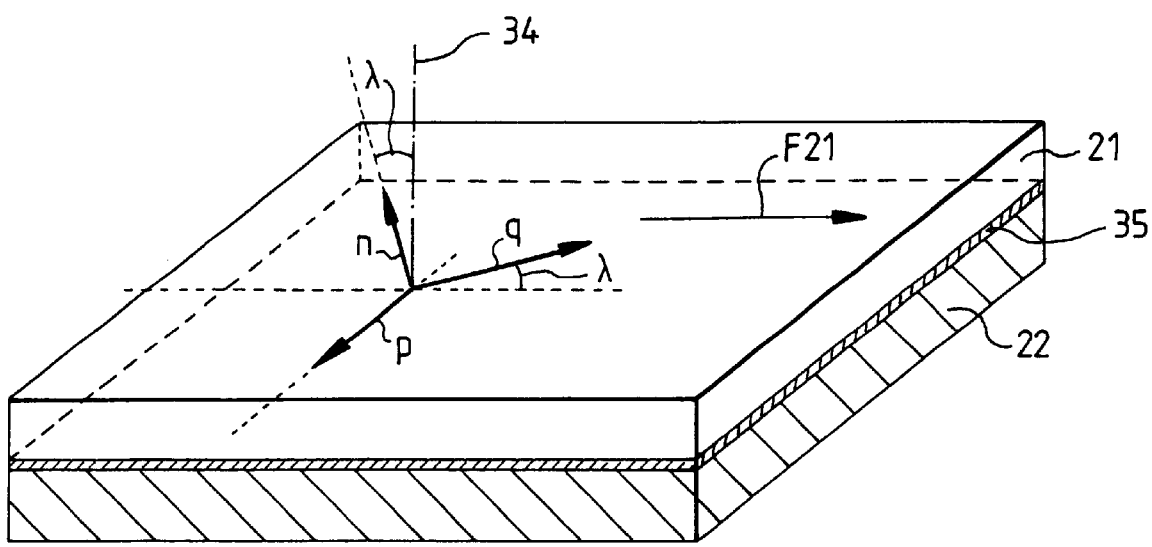
FIG. 3 shows a part of a compensation film of the prior art.

FIG. 3 shows part of the rear compensation film 25 already illustrated by FIG. 2; this film 25 comprises a negative uniaxial medium 22 the fast extraordinary axis of which is oriented along the normal 34 to the film and the upper face 35 of which has been rubbed in the direction F21; this film also comprises a negative uniaxial medium 21 the extraordinary n of which is inclined with respect to this normal 34 by an angle λ in the plane containing the normal 34 and the rubbing direction F21. The index ellipsoid which characterizes the medium 21 is axisymmetric about the axis n which is the optical axis or extraordinary axis of this medium. An ordinary axis p is both in the XY plane of the cell and perpendicular to the extraordinary axis n, a second ordinary axis q is perpendicular to the axes n and p. A wave arriving perpendicular to the substrate 21 along the straight line 34 sees two neutral lines: the slow axis is the p axis and the fast axis is the projection of the q axis onto the plane of the substrate.

When the cell of FIG. 2 is seen from the front, i.e. in the negative direction of the Z axis, the polarizer 28 is in the foreground and the orientations of the different elements of the stack are illustrated by FIG. 4 in the XY plane of the cell. An orientation in the plane is shown in FIG. 4 by an arrow, and the orientations of the superimposed elements are also superimposed. Thus the alignment directions A31 and A33 on the faces of the nematic crystal layer are perpendicular, the pass directions P26 and P28 of the polarizers are also perpendicular to each other and the rubbing directions F21 and F23 of the compensation films are also perpendicular to each other. The pass axis P26 of the polarizer 26 is perpendicular to the direction F21 and parallel to the direction of the p axis of FIG. 3. Also, the pass axis P28 of the polarizer 28 is perpendicular to the direction F23 of the closest inclined negative uniaxial material. Note, in FIG. 4, the internal bisector G of the alignment directions (A31, A33) of the outermost molecules of the liquid crystal layer 20.

FIG. 5 shows an embodiment of the invention from the same point of view as FIG. 4. In this embodiment, the liquid crystal cell comprises the stacked elements described previously, such as the cell of the prior art of FIG. 2, but the invention consists in orienting them in a different way, which has the advantage of improving the observation angle of a panel comprising such cells.

By observing this cell according to the invention from the front, in the negative direction of the Z axis normal to this cell, the latter comprises successively, between a polarizer 28 of pass axis P28 at the front and a polarizer 26 of pass axis P26 at the rear, a compensation film 27 comprising a first negative uniaxial material 24 with an axis along Z and a second negative uniaxial material 23 with an axis inclined with respect to Z and with respect to the XY plane, the orientation of the second material being given in the XY plane by a direction F23; a nematic liquid crystal layer 20 having an alignment direction at the front A33 and another at the rear A31; a compensation film 25 comprising a third inclined negative uniaxial material 21 whose orientation in the XY plane is given by a direction F21 and a fourth negative uniaxial material 22 with an axis Z. The direction F23 of the second material in the XY plane is aligned with the orthogonal projection onto this plane of the direction of the extraordinary axis n of the second negative uniaxial material 23 with inclined extraordinary axis, and the direction F23 is oriented in the opposite direction to this projection. Similarly, the direction F21 is aligned with the projection onto the XY plane of the direction of the extraordinary axis n of the third negative uniaxial material 21 inclined to the normal to the XY plane and in the opposite direction.

This cell preferably has a twist of 90 degrees for the helix of the nematic crystal in the rest state, and has perpendicular alignment directions A31 and A33. When the liquid crystal cell is not activated, the molecules which are in a plane which is parallel to the XY plane and is situated in the middle of the thickness of the liquid crystal layer 20 are approximately parallel to the Y axis. The Y axis is preferably oriented from the bottom toward the top of the screen. The polarization directions P26 and P28 are uncrossed, they are separated by an angle of 90+A degrees. The value of the angle A being preferably greater than 2 degrees and less than 20 degrees, for example between 2 and 6 degrees. In the embodiment of FIG. 5, the polarization direction P26 at the rear of the cell is separated by an angle 90+A/2 degrees from the closest alignment direction A31 and similarly for the corresponding directions of the front of the cell, P28 and A33, are separated by the same angle taken in the reverse direction. The bisectors of the alignment directions A31 and A33 (which alignment directions are, for example, rubbing directions of the substrates containing the liquid crystal) of the outermost molecules of the liquid crystal layer are preferably the bisectors of the pass directions of the polarizers P26 and P28.

In this embodiment of the invention, the orientation F23 in the XY plane of the inclined film 23 at the front of the cell remains parallel to the pass direction P26 of the polarizer furthest away. Similarly the orientation F21 of the inclined film 21 at the rear of the cell is parallel to the pass direction P28 of the polarizer at the front of the cell which is the furthest away from the film 21. The compensation films are uncrossed by the same value as the polarizers.

However, in another embodiment of the invention, the orientations F23 and F21 can be uncrossed without being parallel to the pass direction of the corresponding polarizers.

The orientations F23 and F21 are, for example, separated by an angle 90+B degrees where the angle B is nonzero and may be different from the angle A. The bisectors of the alignment directions A31 and A33 of the outermost molecules of the liquid crystal layer within its thickness are preferably the bisectors of the orientations F23 and F21 of the optical compensation structures. The angle B is preferably equal to the angle A.

In another embodiment of the invention, the uncrossing of the polarizers P26 and P28 corresponds, with reference to the initial position of FIG. 4, to a rotation by a first angle C about the normal to the cell of one of the polarizers, P26, and to a rotation by a second angle D about the same axis but in the reverse direction of the other one of the polarizers, P28. The polarization directions P26 and P28 are separated by an angle 90+C+D degrees and the values of the first and of the second angle of rotation are different. The bisectors of the alignment directions of the outermost molecules of the liquid crystal layer are not collinear with the bisectors of the pass directions of the polarizers (P26, P28). Each of the values C, D of the angles of rotation is preferably positive and less than 20 degrees. The two angular values C and D are not simultaneously zero. Each compensation structure is preferably uncrossed like the closest polarizer. In a preferred embodiment, one of the two angular values of rotation is zero, for example the first angle C is zero. In this embodiment shown in FIG. 6, a first compensation structure is not uncrossed on one side of the liquid crystal layer, for example the orientation structure F21 on the incident illuminating light side, and a second orientation compensation structure F23 is uncrossed. In the implementation of this embodiment, only the second uncrossed orientation compensation structure F23 needs to be cut from the material of a commercial structure, taking the uncrossing angle into account, the first structure being one used directly as sold commercially. This embodiment is easier to produce and less expensive than that comprising two structures modified on the basis of the available structures. The orientations F21 and F23 are separated by an angle 90+D. Preferably the angle C is zero and the angle D is equal to 4 degrees.

In the invention, for a liquid crystal cell having polarizers of the crossed type, the pass directions of the polarizers are no longer perpendicular. Compared with the positioning of the prior art, where the pass directions of the polarizers are effectively perpendicular, so that one polarizer is able to block the light polarized by the other, the polarizers according to the invention have undergone rotations about the normal Z to the XY plane of the cell, the rotation for one of the polarizers being in the opposite direction to that for the other polarizer. The polarizers of the invention are uncrossed. The uncrossing of the polarizers is measured by the value of the angle A. The uncrossing corresponds to an angle A greater than 2 degrees. In the invention, the structures for compensating for the contrast variations of the liquid crystal cell are also uncrossed with each other. Each compensation structure 25, 27 has a direction F21, F23 in the XY plane of the cell and these two directions are not perpendicular to each other.

Within the thickness of the cell according to the invention, the relative orientations of the twisted crystal layer, of the pair of polarizers and of the pair of compensation structures maximize the horizontal viewing angle of the device. In the embodiment of FIG. 5, the uncrossing is done so as to move away from the internal bisector of the alignment directions A31 and A33 of the outermost molecules of the liquid crystal layer. The internal bisector is parallel to the Y axis. Observation of the panel is good for any observation angle within an extended range around the normal to the panel. Good observation is quantified here by the perception of a contrast at least greater than a minimum acceptable value over the angular range in question and by an absence of contrast inversion, the contrast being the ratio of the transmission of a cell in the activated state to that in the unactivated state.

In the embodiment of FIG. 6, neither the polarizer P26 nor the orientation compensation structure F21 closest to this polarizer is uncrossed. The polarizer P28 and the orientation structure F23 are uncrossed by the same value. This makes it possible to extend horizontally the conoscope corresponding to FIG. 4, which already exhibits good characteristics in the vertical direction.

The invention makes it possible to extend the range of horizontal viewing angles for which a vertical panel exhibits good legibility. In particular, a contrast at least equal to 40 is obtained for a horizontal viewing angle up to 40 degrees with respect to the normal to the panel.

Further, the invention allows a greater increase in the horizontal viewing angle when the uncrossing, proportional to the angle A, is greater. For example, for an uncrossing of 2 degrees (therefore A is equal to 4 degrees), a horizontal viewing angle range of −45 degrees to +45 degrees is obtained, the range being centred on the normal to the panel. The invention makes it possible to match the viewing angle to need by adjusting the angular value of the uncrossing of the compensation structure and of the polarizer.

In a addition, an alternative embodiment of the invention consists in reducing the thickness of the liquid crystal layer. For example, the thickness is reduced from 4.9 microns to 4.6 microns. For an identical uncrossing, this alternative exhibits an improvement in the horizontal viewing angle.

What is claimed is:

1. A display device having a liquid crystal cell, comprising:
   a layer of twisted nematic liquid crystal placed between two polarizers and comprising, between the layer of liquid crystal and each of the polarizers, a first compensation structure and a second compensation structure, respectively, for compensating for cell contrast variations according to an observation angle, wherein
   each of the first and second compensation structures comprise (1) a layer of a negative uniaxial birefringent material having an extraordinary axis perpendicular to a plane of the cell, on which (2) a layer of a negative uniaxial birefringent material having an extraordinary axis inclined with respect to a normal to the plane of the cell is superimposed, respective orientations of the first and second compensation structures being in the opposite direction to respective projections of the inclined extraordinary axes to the plane of the cell;
   the pass directions of the polarizers are separated by an angle of 90+A degrees, wherein A is not zero; and
   the respective orientations of the first and second compensation structures are separated by an angle of 90+B degrees, wherein B is not zero.

2. The device as in claim 1, wherein the twist is at 90 degrees and the angle A is greater than 2 degrees.

3. The device as in claim 1, wherein the bisectors of the alignment directions of the outermost molecules of the liquid crystal layer are the bisectors of the pass directions of the polarizers.

4. The device as in claim 1, wherein the bisectors of the alignment directions of the outermost molecules of the liquid crystal layer are the bisectors of the orientations of the first and second compensation structures.

5. The device as in claim 1, wherein bisectors of the alignment directions of the outermost molecules of the liquid crystal layer are not collinear with the bisectors of the pass directions of the polarizers.

6. The device as in claim 1, wherein the directions of the polarizers and the orientations are separated by the internal bisector of the alignment directions of the outermost molecules of the liquid crystal layer.

7. The device as in claim 5, wherein twisting of the polarizers corresponds to a rotation by a first angle C about the normal to the cell of one of the polarizers, and to a rotation by a second angle D about the same axis but in the opposite direction to the other of the polarizers, the polarization directions are separated by an angle 90+C+D degrees and the values of the first angle C and the second angle D of rotation are different.

8. The device as in claim 7, wherein one of the first and second angles C and D is zero, the other being nonzero.

9. The device as in claim 8, wherein the compensation structure closest to each of the polarizers is twisted by the same value as the polarizer.

10. The device as in claim 8, wherein the nonzero angle is equal to four degrees.

11. The device as in claim 1, wherein, within a thickness of the cell, orientations of the twisted crystal layer, the pass directions of the polarizers, and the respective orientations of the first and second compensation structures maximize a horizontal viewing angle of the device.

12. The device as in claim 1, wherein the angles A and B are equal.

13. The device as in claim 1, wherein the value of the angle A and the angle B are between 2 and 6 degrees.

14. The device as in claim 1, wherein an increase in a horizontal viewing angle is adjustable by increasing a twisting of the polarizers.

15. The device as in claim 1, wherein a horizontal viewing angle of the device is increased by reducing a thickness of the liquid crystal layer.

16. A display device having a liquid crystal cell, the liquid crystal cell comprising:
   a layer of twisted nematic liquid crystal placed between first and second polarizers,
   a first compensating structure disposed between the layer of twisted nematic liquid crystal and said first polarizer arranged to receive light from a light source, and a second compensating structure disposed between the layer of twisted nematic liquid crystal and said second polarizer arranged away from the light source, wherein
   each of said first and second compensating structures includes a layer of a negative uniaxial birefringent material having an extraordinary axis perpendicular to a plane of the cell, said layer of the negative uniaxial birefringent material superimposed with a layer of a negative uniaxial birefringent material having an extraordinary axis inclined with respect to a normal to the plane of the cell;
   said second compensating structure is oriented in a direction opposite to a projection of the inclined extraordinary axis to the plane of the cell;
   pass directions of the first and second polarizers are separated by an angle of 90+A degrees, wherein A is not zero; and
   orientations of said first and second compensating structures are separated by an angle of 90+B degrees, wherein B is not zero.

17. A display device having a liquid crystal cell, the liquid crystal cell comprising:
   a layer of twisted nematic liquid crystal placed between first and second polarizers;
   a first compensating structure disposed between the layer of twisted nematic liquid crystal and said first polarizer, and a second compensating structure disposed between the layer of twisted nematic liquid crystal and said second polarizer, wherein
   each of said first and second compensating structures includes a layer of a negative uniaxial birefringent material having an extraordinary axis perpendicular to a plane of the cell, said layer of the negative uniaxial birefringent material superimposed with a layer of a negative uniaxial birefringent material having an extraordinary axis inclined with respect to the normal to the plane of the cell;
   an orientation of said negative uniaxial birefringent material of said second compensating structure is parallel to a pass direction of said first polarizer;
   each of said compensating structures is oriented in respective directions opposite to respective projections of the inclined extraordinary axes to the plane of the cell;
   the pass direction of said first polarizer and a pass direction of said second polarizer are separated by an angle of 90+A degrees, wherein A is not zero; and
   orientations of said first and second compensating structures are separated by an angle of 90+B degrees, wherein B is not zero.

* * * * *